Feb. 23, 1954 — R. J. HAMLER — 2,669,772
TOOL FOR HANDLING RETAINING RINGS
Filed Sept. 9, 1950
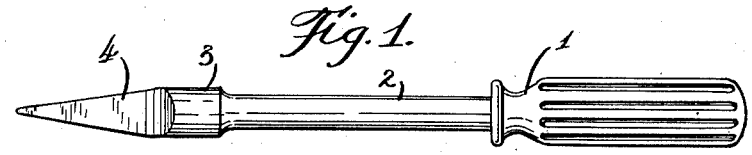
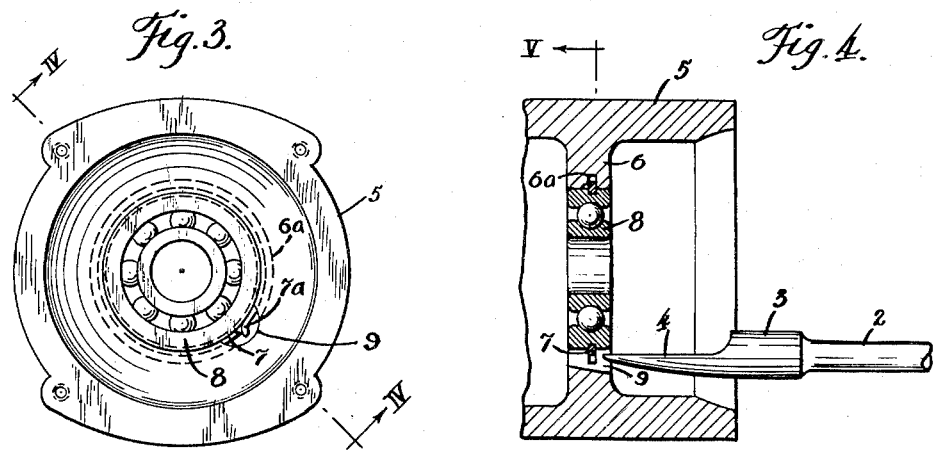
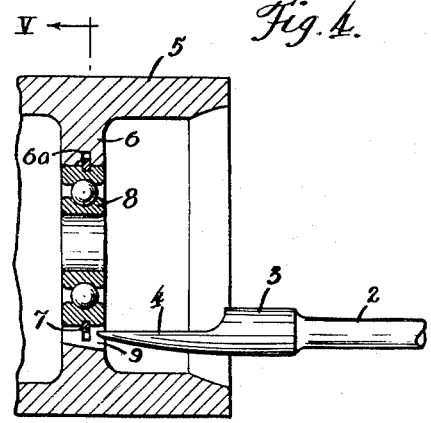
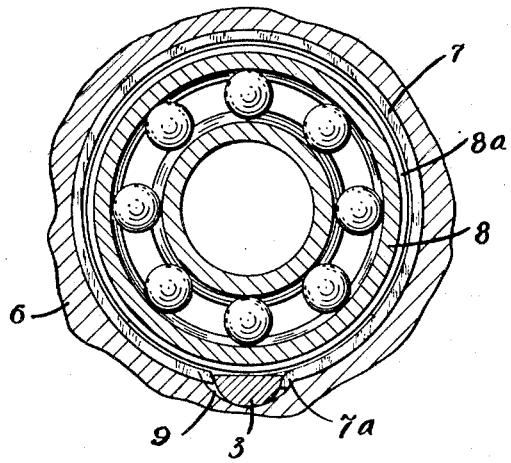
Inventor
Robert J. Hamler.
By William J. Ruano
Attorney Patented Feb. 23, 1954

2,669,772

UNITED STATES PATENT OFFICE 2,669,772

TOOL FOR HANDLING RETAINING RINGS

Robert J. Hamler, Pittsburgh, Pa.

Application September 9, 1950, Serial No. 183,939

3 Claims. (Cl. 29—229)

This invention relates to improvements in a tool for handling open-ended retaining rings, such as the ring which holds the bearing in an automobile transmission housing.

Considerable difficulty is encountered in handling open-ended retaining rings of the type adapted to be sprung into the groove of a bearing, shaft or housing in view of the fact that such rings must be spread open while, for example, a bearing is being slipped into place in the housing portion on which it is mounted. A common type of tool which is used for spreading retaining rings of this kind is a plier-type tool. In some instances, the plier points are inserted into apertures formed in the end portions of the ring so as to form a positive grip and enable spreading of the ring. These apertures have the disadvantage of weakening the ring and adding to the cost of manufacture. Furthermore, either with or without apertures, difficulty is usually encountered in the insertion of the plier points into position on the ring ends since clearances are very small, being limited generally to the thickness of the ring, and adequate frictional grip on the ring so that it may be spread is exceedingly difficult to obtain, therefore resulting in frequent slippage and requiring considerable time for spreading of the ring and mounting of the bearing.

A still further disadvantage in the use of plier-type tools for handling open-ended retaining rings or snap rings is that such tools are usually quite complicated in construction, difficult to manufacture and therefore relatively expensive. Furthermore, retaining rings which are spread open by an abnormal amount are either broken or provided with a permanent set in the spread position.

An object of the present invention is to provide a tool for handling open-ended retaining rings, which tool is devoid of the above mentioned disadvantages of plier-type and similar tools.

A more specific object of the present invention is to provide a tool for handling open-ended retaining rings, which tool is of relatively simple construction and yet which is positive in operation, requiring minimum effort and time for the the purpose of expanding the retaining ring.

Another specific object of the present invention is to provide a tool which is so shaped that it is particularly adapted for expanding the open-ended retaining ring which is seated in the outer grooved peripheral portion of the race of a ball bearing and in the inner confronting groove of a transmission housing, which ring detachably mounts the bearing in the housing such as provided in Chevrolet passenger cars or one-half ton trucks, and which tool is adapted to disassemble such bearing by the mere insertion of its point between end portions of the ring.

Other objects and advantages of the present invention will be apparent from a study of the following description taken with the accompanying drawing wherein:

Fig. 1 is a plan view of a tool embodying the principles of my invention and adapted to disassemble open-ended retaining rings such as used for mounting the bearings in Chevrolet automobile transmissions;

Fig. 2 is a side view of the tool shown in Fig. 1 taken at right angles to the plane of Fig. 1;

Fig. 3 is a front view of a fragmentary portion of the transmission housing and of the bearing mounting of a Chevrolet automobile transmission including an open-ended retaining ring for holding the bearing in a mounted position in the housing;

Fig. 4 is a longitudinal cross-sectional view taken along line IV—IV of Fig. 3, and Fig. 5 is a transverse cross-sectional view taken along line V—V of Fig. 4.

Referring more particularly to Figs. 1 and 2 which show a tool for handling open-ended retaining rings, numeral 1 denotes a handle portion, numeral 2 a stem portion, and numeral 3 a pointed end portion of the tool, which portions are integrally secured together. End portion 3 is somewhat of the shape of a cone with a slight, outwardly curved surface, which cone has a cut out portion 4 comprising a flat surface near the end thereof and terminating in a curve to form a somewhat spoon-shaped surface for the purpose of providing a wedging action to expand the retaining ring as will be shown hereinafter. The tool is preferably made of metal although the handle portion may be made of rubber composition, plastic or other suitable material if so desired.

Figs. 3, 4 and 5 show a portion 5 of a housing of an automobile transmission, such as that on a Chevrolet passenger car or one-half ton truck, which housing portion has an inwardly extending, annular flange portion 6 whose inner periphery is provided with a groove 6a and in which may be seated an open-ended retaining ring 7. Ring 7 is made of suitable spring steel and is split to provide closely adjacent end portions. One of its end portions 7a is usually outwardly curved although such curvature is not necessary for the purposes of the present invention. A ball bearing denoted generally by numeral 8 is adapted to be detachably mounted in place in alignment with the flange portion 6 of the housing. The outer peripheral surface of the ball bearing is provided with a peripheral groove 8a into which the inner peripheral portion of ring 7 is adapted to extend. Thus it will be seen that when the ball bearing is in proper position, the retaining ring 7 expands and is seated in grooves 6a and 8a of the housing and outer race of the bearing, respectively, so as to mount the bearing in position in relation to the housing.

In conventional Chevrolet transmission housings, the flange portion 6a is usually provided with an arcuate or moon-shaped cut out portion 9 to provide the necessary clearance for insertion of a plier-type of tool.

Referring again to the shape of the tool end portion 3, it will be noted that the curvature thereof corresponds to the curvature of the cut out portion 9, therefore the tool end portion is adapted to be snugly seated in the cut out portion 9 as the point thereof is inserted and pushed between the ends of the retaining ring 7.

In operation, assume that the bearing is mounted in place in the transmission housing as shown in Fig. 4. In order to disassemble the bearing, the point of the tool is inserted between the ends of the ring with the flattened part of the spoon-shaped surface facing the bearing as the point is moved farther and farther into the opening 9. During such insertion, the flattened surface of the tool is adapted to rest against the outer peripheral surface of the outer race of the bearing while the wedge-shaped point thereof exerts a wedging action between the ends of the ring so as to cause spreading thereof. Finally, as the tool is pushed sufficiently inwardly so that its outer curved surface becomes seated in the correspondingly shaped curved surface of aperture 9, the spreading of the ring ceases. By this time the ring is sufficiently expanded so as to clear the greatest dimension of the bearing and thereby allow axial movement and removal thereof from the housing.

It will be noted that the cut out portion 9 serves as a guide for the tool point and serves also to limit the extent of spread of the retaining ring so as to avoid the possibility of ring breakage or of imparting a permanent set to the ring by abnormal spreading thereof as might occur in the use of a plier-type tool or the like.

When it is desired to assemble the bearing and mount it in the housing, it is first inserted as far as it will go within flange portion 6, that is, until its side surface abuts the inwardly projecting portion of ring 7 while the ring is positioned in groove 6a of the housing. The point of the tool is then inserted between the ends of the ring and moved through aperture 9 so as to spread the ring. As the ring is spread sufficiently so as to clear the maximum dimension of the bearing, the bearing may be pushed into place, that is, into the position shown in Fig. 4 wherein its outer groove is in registry with the housing groove 6a, at which time the tool is retracted and ring 7 contracts and snaps into place so that its thickness extends into both of the confronting grooves and thereby will hold the bearing in a mounted position.

Thus it will be seen that I have provided a highly efficient tool for handling open-ended retaining rings in Chevrolet transmissions and the like, which tool is extremely simple in construction, inexpensive to manufacture and very easy to operate, and which enables assembly or disassembly of the bearing in a matter of a few seconds as distinguished from the time consuming and tedious operation required by the use of other tools for effecting spreading of the ring during the mounting or disassembly operation; furthermore, I have provided a tool which provides a limit to the spreading movement of the ring, thereby avoiding permanent set or breakage of the ring during such spreading movement.

While I have illustrated and described a certain specific embodiment of my invention, it will be apparent that this is by way of illustration only, and that various changes and modifications may be made within the contemplation of my invention, and within the scope of the following claims.

I claim:

1. A tool for spreading open-ended retaining rings, comprising an integral handle, shank and ring-engaging end portion having a common longitudinal axis, said end portion being pointed and being of substantially conical shape with respect to said axis and having a flat cut out portion extending along the central longitudinal plane of said conical shape.

2. A tool adapted for insertion into a substantially crescent-shaped groove, into which groove project the ends of an open-ended retaining ring, for spreading the ring, comprising an integral handle, shank and ring-engaging end portion having a common longitudinal axis, said end portion being somewhat spoon-shaped by having a conical outer surface with a slight outward curvature and having a substantially flat cut out portion extending along part of the central longitudinal plane of said end portion, whereby said outer conical surface may be seated in said groove when spreading apart the ends of said ring by wedging action of said end portion, to limit said spreading and thus prevent permanent set or breakage tendency of the ring.

3. A tool for spreading apart the ends of an open-ended retaining ring in a transmission housing, comprising a handle, shank and ring-engaging end portion integrally secured together and having a common longitudinal axis, said end portion being pointed and having a substantially conical outer surface with respect to said axis, which surface is slightly convex; said end portion having a cut out portion extending along a flat, central, longitudinal plane along the terminal portion of said end portion.

ROBERT J. HAMLER.

References Cited in the file of this patent

UNITED STATES PATENTS

| Number | Name | Date |
|---|---|---|
| 1,424,261 | Rudolph | Aug. 1, 1922 |
| 1,580,235 | DiPrima | Apr. 13, 1926 |
| 1,667,227 | Thompson | Apr. 24, 1928 |
| 1,719,311 | Sargent | July 2, 1929 |
| 1,785,076 | Freshkoff | Dec. 16, 1930 |
| 1,984,960 | Beard | Dec. 18, 1934 |
| 1,989,918 | Drypolcher | Feb. 5, 1935 |